3,118,917
ENOL ETHERS OF 3-KETO-5α-ANDROSTANES
Alberto Ercoli, Milan, and Rinaldo Gardi, Carate Brianza, Italy, assignors to Francesco Vismara S.p.A., Casatenovo (Como), Italy, a corporation
No Drawing. Filed July 17, 1961, Ser. No. 124,385
Claims priority, application Italy Oct. 12, 1960
13 Claims. (Cl. 260—397.5)

The present invention relates to new steroid compounds, and is more particularly concerned with certain new and useful enol ethers of steroids of the 3-keto-5α-androstane series.

The new compounds of this invention may be represented by the following formula:

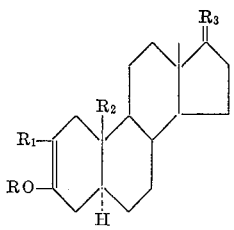

wherein R represents an aliphatic, cycloaliphatic or arylaliphatic hydrocarbon radical containing from five to eighteen carbon atoms, inclusive; $R_1$ and $R_2$ are hydrogen or methyl; $R_3$ represents a ketonic oxygen atom or a grouping

in which X is hydrogen or the acyl residue of an alkanoic acid and $R_4$ represents hydrogen or a lower hydrocarbon radical containing from one to three carbon atoms, inclusive, preferably methyl, ethyl, propyl, allyl, vinyl or ethynyl.

The higher enol ethers of the 3-keto-5α-androstane series of this invention are useful because of their various biological properties. They possess lipotropic activity and a satisfactory anabolic effect. Although being weakly androgenic, they show a remarkable antitesticular effect as observed in the prepuberal rat test. They also possess a pronounced antigonadotrophic activity which makes the compounds of this invention useful in decreasing the production of hypophysis hormones.

The 3-enol ethers of steroids of the 3-keto-5α-androstane series of this invention can be prepared from the enol ethers of the corresponding Δ⁴-3-ketones (ethers of 3-hydroxy-androst-3,5-dienes), by catalytic hydrogenation with a calculated amount of hydrogen in order to hydrogenate only the double bond in the 5-position of the Δ³,⁵-dien system. By the shifting of the remaining double bond to the 2:3-position, the corresponding enol ethers of the 3-keto-5α-androstane compounds are readily obtained.

The selective hydrogenation is usually carried out at room temperature (from +5 to +30 degrees centigrade), in solution in an inert organic solvent and in the presence of a suitable catalyst, such as nickel, platinum and palladium supported on inert material, for instance, barium sulfate, calcium carbonate, diatomaceous earth and the like. Palladium on calcium carbonate is the preferred catalyst. Suitable solvents for the catalytic hydrogenation are alcohols, dioxan, tetrahydrofuran, benzene, hexane and the like. Mixtures of solvents can also be employed, such as, for example, a mixture of tetrahydrofuran and alcohol.

The hydrogenation step is over when a mole of hydrogen has been consumed for each mole of the 3-enol ether of the Δ⁴-3-keto compound reacted.

The starting material, a higher aliphatic, a cycloaliphatic or an arylaliphatic enol ether of a Δ⁴-3-keto-androstene, can be prepared by treatment of the corresponding ethyl enol ether with the appropriate aliphatic, cycloaliphatic or arylaliphatic alcohol, containing from five to eighteen carbon atoms, inclusive, according to an exchange reaction as disclosed in U.S. copending application Serial No. 26,711, filed on May 4, 1960, now Patent No. 3,019,241.

The exchange reaction is usually carried out in the presence of an acid catalyst and in solution in an inert organic solvent. Suitable catalysts are the sulfonic aromatic acids, such as toluene, benzene, naphthalene or anthraquinone sulfonic acids, or sulfosalicylic acid, as well as Lewis acids, such as, for example, $SnCl_4$ or $SbCl_5$. Salts of organic bases with mineral acids, for example pyridine hydrochloride or trialkylammonium chloride, can also be employed as catalysts.

The inert organic solvent is preferably a non-polar solvent, such as benzene and its homologues, cyclohexane, isooctane, tetrahydrofuran, dioxan or a halogenated organic solvent, such as ethylene bromide, chloroform or tetrachlorethane. Dimethylformamide can be also employed as solvent. The reaction mixture consisting of the starting enol ether, suspended or dissolved in one of the above mentioned solvents, the appropriate alcohol and the acid catalyst is heated to boiling and an aliquot of the solvent is distilled off in order to eliminate the ethyl alcohol from the reaction mixture. The desired higher enol ether is then obtained, after removing the solvent, by successive crystallization in the usual manner.

The compounds of this invention can be also obtained by an alternate route which comprises first, catalytically hydrogenating the starting enol ethyl ether of a Δ⁴-3-keto compound and then subjecting the resulting enol ethyl ether of a 3-keto-5α-androstane derivative to the exchange reaction with the appropriate alcohol as indicated above, in order to obtain the desired higher enol ether of Formula I.

If the resulting steroid derivative contains a keto group in the 17-position, it can be submitted, if desired, to a further step in order to transform the 17-keto group, into a hydroxy group by normal reduction methods, for instance by treatment with lithium-aluminum hydride or sodium borohydride, in turn the 17β-hydroxy derivative can be esterified by treatment with an anhydride or chloride of an organic carboxylic acid according to known procedures.

The preparation of the 17α-substituted androstane derivatives of this invention can be accomplished by reacting the higher 3-enol ethers of 3,17-diketo-5α-androstane with a hydrocarbon halide Grignard reagent, such as a methyl, ethyl or propyl magnesium bromide, in order to obtain the corresponding 17α-alkyl, 17β-hydroxy compound.

Obviously, the Grignard reagent may be varied by simple substitution of the alkyl group with an alkenyl group such as allyl or vinyl to yield the corresponding 17α-alkenyl (allyl or vinyl), 17β-hydroxy compound.

If desired, the 3-enol ether of the 3,17-diketo-5α-androstane resulting from the exchange reaction can be subjected to treatment with an alkaline acetylide, for instance potassium acetylide, to yield the corresponding 17α-ethynyl, 17β-hydroxy compound.

The following examples are set forth as illustrating in detail the materials and methods for the preparation of the new compounds but they are not to be regarded as limiting the invention:

*Example 1*

0.2 g. of PdO supported on $CaCO_3$ (1% in Pd) suspended in a mixture of 10 cc. of tetrahydrofuran and 3 cc. of methanol are treated with hydrogen to reduce the PdO to free palladium. Then, 1 g. of the 3-ethyl enol ether of androstendione dissolved in 10 cc. of tetrahydrofuran is added and the reaction mixture hydrogenated at room temperature (+25° C.) until hydrogen is consumed in the ratio of one mole for each mole of the starting material.

The catalyst is filtered off and the mixture is concentrated under vacuum. The residue, after crystallization from methanol, consists of the 3-ethyl enol ether of 5α - androstane - 3,17 - dione, M. Pt. 110–113° C.; $[\alpha]_D = +113°$ (dioxan).

This compound (1 g.) is heated to reflux in a mixture of 300 cc. of benzene and 2.5 cc. of cyclopentyl alcohol containing 30 mg. of p.toluensulfonic acid. After distillation of 250 cc. of benzene, a little pyridine is added to the remaining solution and the solvent completely eliminated under vacuum. By crystallization of the residue from methanol, the 3-cyclopentyl enol ether of androstandione is obtained, M. Pt. 139–141° C.; $[\alpha]_D = +122°$ (dioxan).

To 1 g. of the 3-cyclopentyl enol ether of androstane-3,17-dione, dissolved in 40 cc. of 95% ethanol, are added 170 mg. of sodium borohydride in 5 cc. of water solution. The mixture is stirred gently overnight, and then it is neutralized with dilute acetic acid and precipitated with water to give the 3-cyclopentyl enol ether of androstane-17β-ol-3-one. This compound shows, after crystallization from methanol, melting point 120–123° C.; $[\alpha]_D = +63°$ (dioxan).

A solution of 1 g. of the 3-cyclopentyl enol ether of androstane-17β-ol-3-one in 10 cc. of pyridine is treated with 5 cc. of propionic anhydride to yield the cyclopentyl enol ether of androstanolone propionate, M. Pt. 109–113° C.; $[\alpha]_D = +27.5$ (dioxan).

Example 2

After reducing with hydrogen 0.2 g. of PdO on CaCO$_3$ (1% in Pd) suspended in a mixture of 5 cc. of tetrahydrofuran and 5 cc. of ethanol, 1 g. of testosterone 3-n.heptyl enol ether dissolved in 10 cc. of tetrahydrofuran is added to the suspension of the catalyst and the mixture hydrogenated at room temperature as in Example 1 to give androstanolone 3-heptyl enol ether, M. Pt. 53–55° C.; $[\alpha]_D = +44$ (dioxan).

By treatment of this compound (0.5 g.) with 3 cc. of oenanthic anhydride in pyridine solution, the 3-heptyl enol ether of androstanolone oenanthate is obtained.

Example 3

1.5 g. of the 3-enol ethyl ether of testosterone propionate in 150 cc. of benzene solution are mixed with 4 cc. of n.octyl alcohol and 20 mg. of p.toluensulfonic acid. The mixture is heated and distilled for about thirty minutes, so that the ethyl alcohol which formed during the reaction is completely removed. To the residual solution, a few drops of pyridine are added and the mixture concentrated under vacuum. The residue consisting of the 3-n.octyl enol ether of testosterone propionate is dissolved in 10 cc. of tetrahydrofuran and hydrogenated with hydrogen in the presence of palladium on calcium carbonate, as in Example 1, to give the 3-n.octyl enol ether of androstanolone propionate, M. Pt. 35–40° C.; $[\alpha]_D = +16.5$ (dioxan).

By substituting in the above reaction, the 3-ethyl enol ether of testosterone acetate and the 3-ethyl enol ether of testosterone butyrate for the 3-ethyl enol ether of testosterone propionate, the corresponding 3-n.octyl enol ether of androstanolone acetate, M. Pt. 67–68° C.; $[\alpha]_D = +35$ (dioxan), and respectively the 3-n.octyl enol ether of androstanolone butyrate, M. Pt. 36–38° C.; $[\alpha]_D = +35$ (dioxan), are prepared. Similarly the i.octyl enol ether of androstane-17β-ol-3-one 17-acetate is obtained, M. Pt. 66–67° C.; $[\alpha]_D = +5$ (dioxan).

Example 4

1 g. of the 3-n.amyl enol ether of androst-4-en-3,17-dione (obtained by treatment of the corresponding ethyl enol ether with amyl alcohol as in Example 3) is hydrogenated at room temperature, in tetrahydrofuran solution and in the presence of palladium as catalyst, as previously indicated, to give the 3-n.amyl enol ether of 5α-androstane-3,17-dione, M. Pt. 91–93° C.; $[\alpha]_D = +116°$ (dioxan). This compound treated with potassium borohydride in dioxan solution yields the 3-n.amyl enol ether of 5α - androstane - 17β - ol - 3 - one, M. Pt. 70–73° C.; $[\alpha]_D = +50$ (dioxan).

Likewise, starting from the corresponding 3-enol ether of androst-4-en-3,17-dione the following new compounds are prepared: 3-n.octyl enol ether of 5α-androstane-3,17-dione, M. Pt. 67–68° C.; $[\alpha]_D = +99.5$ (dioxan); 3-n.octyl enol ether of androstane-17β-ol-3-one, M. Pt. 58–60° C.; $[\alpha]_D = +40$ (dioxan); 3-i.octyl enol ether of androstane-17β-ol-3-one, M. Pt. 94–95° C.; $[\alpha]_D = +19$ (dioxan); 3 - cyclopentyl - propyl enol ether of androstandione, M. Pt. 101–103° C.; $[\alpha]_D = +101$ (dioxan), and 3-cyclopentyl propyl enol ether of androstane-17β-ol-3-one, M. Pt. 74–76° C.; $[\alpha]_D = +37.5$ (dioxan).

Example 5

A solution of 2.5 g. of androstendione 3-ethyl enol ether in 300 cc. of benzene is treated with 30 mg. of sulfosalicylic acid and 6 cc. of decyl alcohol. The mixture worked up, as in Example 3, yields the 3-decyl enol ether of androstendione.

This compound (0.9 g.) dissolved in 12 cc. of tetrahydrofuran is treated with hydrogen at room temperature (18° C.) in the presence of 0.2 g. of palladium on calcium carbonate to give the 3-decyl enol ether of androstandione as an oil. In the same manner as above, the 3-capryl enol ether and the 3-n.nonyl enol ether of androstandione are obtained.

Example 6

5. g. of the 3-ethyl enol ether of testosterone are hydrogenated as described in Example 1 and the resulting 3-ethyl enol ether of androstane-17β-ol-3-one, M. Pt. 88–90° C.; $[\alpha]_D = +52$ (dioxan), is treated with 5 cc. of cyclohexanol in 400 cc. of benzene solution. The reaction mixture is heated and distilled to approximately ¼ of the starting volume and concentrated in vacuo. The residue taken up with methanol yields the cyclohexyl enol ether of androstane-17β-ol-3-one, M. Pt. 139–141° C.; $[\alpha]_D = +49$ (dioxan).

By substituting n.nonyl alcohol for cyclohexanol in the above reaction, the n.nonyl enol ether of androstanolone, M. Pt. 56–58° C., $[\alpha]_D = +40$ (dioxan), is obtained. Similarly, the n.decyl enol ether of androstanolone (M. Pt. 48–50° C.; $[\alpha]_D = +42$), the n.undecyl enol ether of androstanolone (M. Pt. 62–63° C., $[\alpha]_D = +30$) and the lauryl enol ether of androstanolone (M. Pt. 68–69° C., $[\alpha]_D = +40.5$) are prepared.

Example 7

By hydrogenating the 3-ethyl enol ether of testosterone propionate, in the presence of palladium on barium sulfate, the ethyl enol ether of androstane-17β-ol-3-one-17 propionate is prepared, M. Pt. 123–127° C., $[\alpha]_D = +14$ (dioxan).

This compound, treated with n.heptyl alcohol as previously described, yields the n.heptyl enol ether of androstanolone 17β-propionate, M. Pt. 79–80° C., $[\alpha]_D = +21.5$ (dioxan).

Example 8

The 3-ethyl enol ether of androstendione (3 g.) is treated with 12 cc. of lauryl alcohol in 300 cc. of dioxan solution, as in Example 3, to give the 3-enol lauryl ether of androstendione. Hydrogenation of this compound in the presence of palladium or calcium carbonate as catalyst, provides the corresponding lauryl enol ether of androstandione.

A solution of 4 g. of this compound in 80 cc. of anhydrous benzene is added to a solution of 25 g. of methyl magnesium bromide in 150 cc. of anhydrous ether. The reaction mixture is refluxed under nitrogen atmosphere for one hour and then allowed to stand overnight at room temperature. The Grignard complex is decomposed with an aqueous solution of 30% ammonium chloride and the separated organic layer washed with water, dried and evaporated under vacuum up to dryness. The residue, taken up with dilute methanol, yields the lauryl enol ether of 17α-methyl-5α-androstane-17β-ol-3-one.

Likewise, by employing allyl-magnesium bromide, the corresponding lauryl enol ether of 17α-allyl-5α-androstane 17β-ol-3-one is obtained.

Example 9

To a solution of 11 g. of methyl magnesium bromide in 60 cc. of dry ether is added with stirring and in nitrogen atmosphere a solution of 1.5 g. of the 3-n.amyl enol ether of androstandione (prepared as in Example 5) in 30 cc. of anhydrous benzene. The reaction mixture worked up as in the foregoing example gives the 3-n.amyl enol ether of 17α-methyl-5α-androstane-17β-ol-3-one, M. Pt. 112–114° C.; $[\alpha]_D = +26$ (dioxan).

Similarly the cyclopentyl enol ether of 17α-methyl-androstane-17β-ol-3-one, M. Pt. 146–148° C.; $[\alpha]_D = +16$ (dioxan), and the n.hexyl enol ether of 17α-methyl-androstane-17β-ol-3-one, M. Pt. 82–84° C.; $[\alpha]_D = +25$ (dioxan), are obtained.

Example 10

To a 500 cc. benzene solution of 2 g. of the 3-ethyl enol ether of androstane-17β-ol-3-one, obtained as described in Example 6, are added 1.2 g. of stearyl alcohol and the mixture distilled for twenty minutes in order to remove the ethyl alcohol produced by the reaction. A little pyridine is then added to the remaining solution and the solvent completely evaporated in vacuo. The residue taken up with methanol gives the stearyl enol ether of 5α-androstane-17β-ol-3-one, M. Pt. 69–70° C.; $[\alpha]_D = +25$ (dioxan).

Likewise, the following new enol ethers of androstanolone are prepared: cetyl enol ther, M. Pt. 72–74° C., $[\alpha]_D = +30.5$ (dioxan); myristyl enol ether, M. Pt. 73–74° C., $[\alpha]_D = +25$ (dioxan) and benzyl enol ether, M. Pt. 129–131° C., $[\alpha]_D = +17.5$ (dioxan).

0.5 g. of the lauryl enol ether are treated with propionic anhydride and pyridine to give the corresponding enol ether of androstanolone 17β-propionate, M. Pt. 68–69° C.; $[\alpha]_D = +31$.

Example 11

By hydrogenating the 3-n.decyl enol ether of Δ⁴-androsten-3,17-dione, according to the procedure described in Example 1, the 3-decyl enol ether of 5α-androstane-3,17-dione is prepared.

A solution of 5 g. of ter.potassium amylate in 30 cc. of ter.amyl alcohol, saturated with a dry acetylene stream, is added to a solution of 1 g. of the 3-decyl enol ether of androstandione in 50 cc. of anhydrous toluene.

Saturation with acetylene is continued for a further two hours always at room temperature, after which the reaction mixture is decomposed with a solution of 30% ammonium chloride. The organic layer is separated, washed with water, dried and evaporated to give as residue the n.decyl enol ether of 17α-ethynyl androstanolone.

Similarly, the octyl, nonyl and dodecyl enol ethers of 17α-ethynyl androstane-17β-ol-3-one are prepared.

Example 12

1 g. of the 3-enol ethyl ether of 19-nortestosterone propionate is dissolved in about 80 cc. of anhydrous benzene and reacted with 15 mg. of p.toluenesulfonic acid and 6 cc. of cyclohexanol. The reaction mixture is heated and the major proportion of the liquid is distilled off so that the ethanol which was formed during the exchange reaction is evaporated off completely. To the residual solution a few drops of pyridine are added and the liquid is evaporated in vacuo.

The residue recrystallized from methanol containing a little pyridine consists of the 3-enol cyclohexyl ether of 19-nortestosterone propionate, melting at 124–126° C.; $[\alpha]_D = -135$ (dioxan).

A mixture of 0.6 g. of the compound, 8 cc. of tetrahydrofuran and 0.8 g. of ten percent palladium-on-carbon catalyst is shaken at room temperature in the presence of hydrogen. Hydrogenation is stopped when hydrogen has been consumed in the ratio of one mole for each mole of the starting material. The mixture is filtered and the filtrate concentrated to dryness to give the 3-enol cyclohexyl ether of nor-androstanolone propionate.

Example 13

800 mg. of 17α-methyl-19-nortestosterone dissolved in 3 cc. of tetrahydrofuran are treated with 0.8 cc. of ethyl orthoformate, 0.5 cc. of anhydrous ethanol and 8 mg. of p.toluensulfonic acid to give 680 mg. of the 3-ethyl enol ether of 17α-methyl-19-nortestosterone melting at 125–128° C.; $[\alpha]_D = -165$ (dioxan).

Hydrogenation of this compound, according to the procedure described in Example 1, provides the corresponding ethyl enol ether of 17α-methyl-19-norandrostane-17β-ol-3-one.

400 mg. of the last mentioned compound are treated in benzene solution with 1.2 cc. of cyclopentyl alcohol and 10 mg. of p.toluensulfonic acid to give the 3-cyclopentyl enol ether of 17α-methyl-19-norandrostane-17β-ol-3-one.

Example 14

In a manner corresponding to that of the Examples 12 and 13, the following new enol ethers are prepared: amyl enol ether of norandrostanolone; cyclopentyl enol ether of norandrostanolone acetate, M. Pt. 121–124° C., $[\alpha]_D = +55$ (dioxan); n.octyl enol ether of norandrostanolone propionate; n.nonyl enol ether of norandrostanolone oenanthate; n.heptyl enol ether of 17α-methyl norandrostanolone; n.decyl and lauryl enol ethers of 17α-methyl norandrostanolone.

Example 15

A mixture of 500 mg. of the 3-enol ethyl ether of norandrostendione (prepared by treatment of norandrostendione with ethylorthoformate and ethyl alcohol as described), 50 cc. of benzene and 25 mg. of p.toluensulfonic acid is treated with 5 cc. of n.octyl alcohol.

A portion of the solvent is distilled off and the remaining solution neutralized with pyridine and concentrated to dryness to give the 3-n.octyl enol ether of norandrostendione.

This compound (300 mg.) hydrogenated as in Example 12 yields the 3-n.octyl enol ether of 19-norandrostane-3,17-dione. In the same manner as above other 19-norandrostandione enol ethers are obtained, including the 3-cyclopentyl, n.hexyl, heptyl, nonyl, lauryl and myristyl enol ethers of 19-norandrostane-3,17-dione.

Example 16

A solution of 200 mg. of the 3-n.octyl enol ether of 19-norandrostane-3,17-dione in 20 cc. of dry ether is added slowly to a solution of 75 mg. of lithium aluminum hydride in absolute ether. The mixture is heated at gentle reflux for ten minutes, then cooled and water carefully added dropwise. The organic layer is separated, washed with water, dried and evaporated to give the 3-n.octyl enol ether of 19-norandrostane-17β-ol-3-one. The compound is treated with acetic anhydride inpyridine solution to obtain the corresponding acetate derivative $[\alpha]_D = +39.6$ (dioxan).

Similarly the n.heptyl enol ether of norandrostanolone acetate, $[\alpha]_D=+40.9°$ (dioxan), the n.dodecyl enol ether of norandrostanolone acetate (M. Pt. 39–41° C.; $[\alpha]_D=+30.3$ (dioxan) are prepared.

*Example 17*

2 g. of 2α-methyltestosterone (prepared by condensation of testosterone with diethyl oxalate in the presence of sodium hydride and treatment of the condensation product with methyl iodide followed by alkaline hydrolysis) are treated with 2 cc. of ethyl orthoformate, 4 cc. of absolute ethanol and 20 mg of p.toluensulfonic acid. The reaction mixture is allowed to stay at room temperature for about 30 minutes, then poured into a boiling mixture of 300 cc. of benzene and 7 cc. of n.amyl alcohol. A part of the solvent is distilled off and to the remaining solution a few drops of pyridine are added and the liquid is completely eliminated under reduced pressure. The residue is taken up with methanol to give the 3-n.amyl enol ether of 2α-methyl testosterone, M. Pt. 108–110° C.; $[\alpha]_D=-97.5$ (dioxan).

This compound is hydrogenated according to the procedure described in the previous examples to give the 3-n.amyl enol ether of 2α-methyl-5α-androstane-17β-ol-3-one, M. Pt. 65–67.5° C., $[\alpha]_D=+28$ (dioxan).

1 g. of the product, dissolved in 15 cc. of pyridine is treated with 5 cc. of acetic anhydride. After standing overnight at room temperature, the solution is poured into water and the precipitate collected by filtration and crystallized from methanol. In this manner, the 3-n.amyl enol ether of 2α-methyl-5α-androstane-17β-ol-3-one-17 acetate is obtained at M. Pt. 112–113° C.; $[\alpha]_D=+15$ (dioxan).

In the same manner as above the following new compounds are prepared: 3-heptyl enol ether of 2α-methyl androstanolone M. Pt. 65–67° C.; $[\alpha]_D=+25$ (dioxan), 3-heptyl enol ether of 2α-methyl 5α-androstane-17β-ol-3-one 17-acetate at M. Pt. 105–107° C.; $[\alpha]_D=+15$ (dioxan), 3-n.octyl enol ether of 2α-methyl androstanolone M. Pt. 44–48° C.; $[\alpha]_D=+19.5$ (dioxan); 3-n.octyl enol ether of 2α-methyl androstanolone 17-acetate, M. Pt. 100–103° C.; $[\alpha]_D=+16$ (dioxan), cyclopentyl enol ether of 2α-methyl androstanolone propionate, hexyl, lauryl and cetyl enol ethers of 2α-methyl androstanolone.

*Example 18*

The product of the previous example, 3-n.amyl enol ether of 2α-methyl-5α-androstane-17β-ol-3-one (1 g.) is treated with a mixture of 10 g. of chromium trioxide and 10 cc. of pyridine and the reaction mixture allowed to stand overnight at room temperature. By dilution with water a crystalline product precipitates which filtered and recrystallized from methanol gives the pure 3-n.amyl enol ether of 2α-methyl-5α-androstane-3,17-dione.

In the same manner as above, hexyl, heptyl, octyl, lauryl and cetyl enol ethers of 2α-methyl androstanolone are converted to the corresponding enol ethers of 2α-methyl androstandione.

*Example 19*

A solution of the 3-n.amyl enol ether of 2α-methyl-5α-androstane-3,17-dione in benzene is added to an ethereal solution of methyl magnesium bromide and the resulting mixture stirred under nitrogen for five hours, then cooled and decomposed with a saturation aqueous ammonium chloride solution. The suspension is extracted with ether and the separated organic layer washed with water, dried and evaporated to yield the 3-n.amyl enol ether of 2α,17α-dimethyl-17β-hydroxy-5α-androstane-3-one.

Other enol ethers of 2α,17α-dimethyl-17β-hydroxy-5α-androstane-3-one, including heptyl, octyl, decyl, lauryl and cetyl enol ethers, are similarly prepared from the corresponding 3-enol ethers of 2α-methyl-5α-androstane-3,17-dione.

*Example 20*

Following the procedure of the previous example, but susbtituting ethyl magnesium bromide for methyl magnesium bromide, there is thus produced the 3-n.amyl enol ether of 2α-methyl-17α-ethyl-17β-hydroxy-5α-androstane-3-one.

Similarly, other enol ethers of 17α-ethyl-2α-methyl-androstanolone including (2-methyl)pentyl, hexyl, cyclohexyl, capryl, nonyl, decyl, dodecyl, myristyl, cetyl and stearyl enol ethers, are prepared.

*Example 21*

Following the procedure of Example 19, but substituting the 3-cyclopentyl enol ether of 2α-methyl-5α-androstane-3,17-dione as the starting steroid, the corresponding cyclopentyl enol ether of 2α,17α-dimethyl-17β-hydroxy-5α-androstane-3-one is prepared.

A solution of 1 g. of this compound in dry pyridine is treated with acetic anhydride until esterification of the 17-hydroxy group is complete to give the 17-acetate derivative.

Similarly, the 3-cyclopentyl enol ether of 2α,17α-dimethyl-17β-hydroxy-5α-androstane-3-one is converted to other 17-acylates by reaction with the appropriate acid anhydride or acid chloride. Examples of these 17-acylates include the formate, propionate, butyrate, valerate, trimethylacetate, oenanthate, cyclopentylpropionate, phenylpropionate and the like.

*Example 22*

Following the procedure of Example 17, 2α-methyl nortestosterone (prepared by the action of methyl iodide on the condensation product of nortestosterone with diethyl oxalate followed by alkaline hydrolysis) is converted to the n.amyl enol ether of 2α-methyl nortestosterone.

By hydrogenation, this compound yields the corresponding n.amyl enol ether of 2α-methyl-19-norandrostanolone. Treatment with propionic anhydride provides the n.amyl enol ether of 2α-methyl-19-norandrostanolone propionate.

Other representative enol ethers of 2α-methyl-19-norandrostanolone which may be prepared by this procedure include cyclopentyl, cyclohexyl, n.hexyl, n.hepthy, octyl, nonyl, decyl, lauryl, cetyl and stearyl enol ethers.

*Example 23*

Following the procedure of Example 19, but substituting 2α-methyl-19-norandrostane-3,17-dione 3-enol amyl ether as the starting steroid, the corresponding enol ether of 2α,17α-dimethyl-17β-hydroxy-19-norandrostane-3-one is obtained.

Esterification with oenanthic anhydride provides the corresponding 17-oenanthate derivative.

We claim:
1. Enol ethers having the formula:

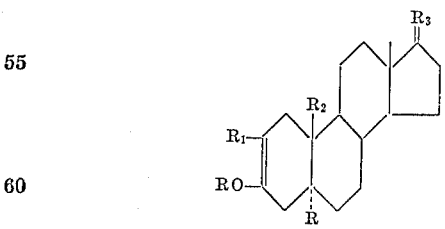

in which R represents a hydrocarbon radical containing from five to eighteen carbon atoms, inclusive, selected from the group consisting of an aliphatic hydrocarbon radical, a cycloaliphatic hydrocarbon radical and an arylaliphatic radical, $R_1$ and $R_2$ are selected from the group consisting of hydrogen and methyl and $R_3$ is selected from the group consisting of a ketonic oxygen atom and a grouping

wherein X is a member selected from the group consisting of hydrogen and the acyl residue of an alkanoic acid and $R_4$ is a member selected from the group consisting of hydrogen and a lower hydrocarbon radical containing from one to three carbon atoms, inclusive.

2. The compound of the formula

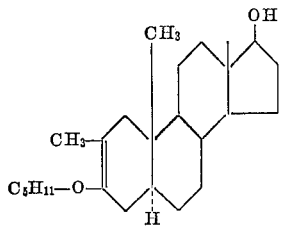

3. The compound of the formula

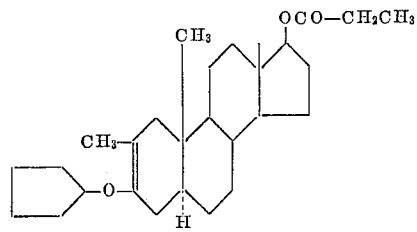

4. The compound of the formula

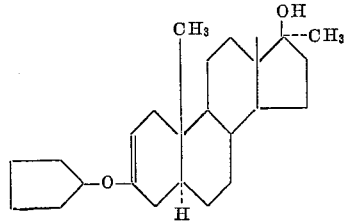

5. The compound of the formula

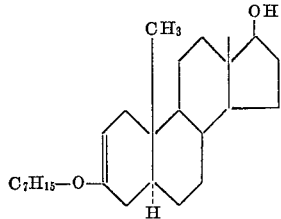

6. The compound of the formula

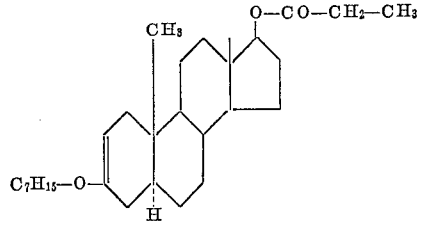

7. The compound of the formula

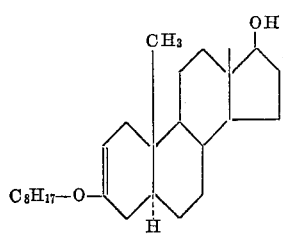

8. The compound of the formula

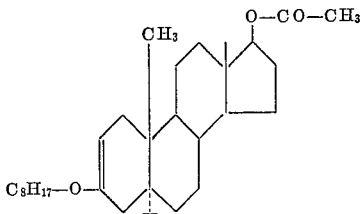

9. The compound of the formula

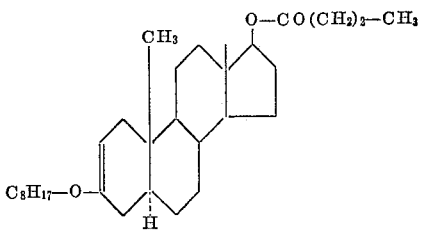

10. The compound of the formula

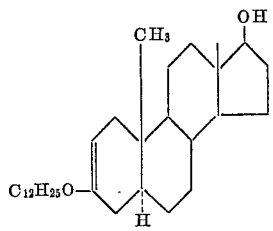

11. The compound of the formula

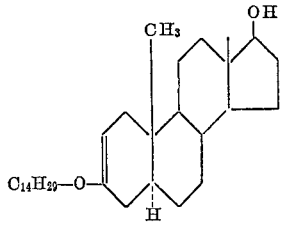

12. The compound of the formula

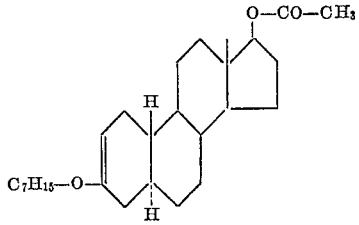

13. The compound of the formula

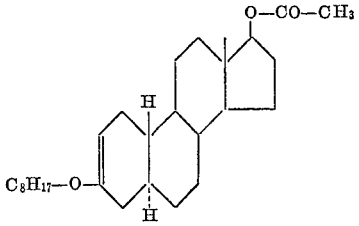

References Cited in the file of this patent
UNITED STATES PATENTS
2,964,537    Engelfried et al. _____ Dec. 13, 1960
OTHER REFERENCES
Ruyle et al., J. Org. Chem., vol. 25, p. 1260 (1960).

UNITED STATES PATENT OFFICE
CERTIFICATE OF CORRECTION

Patent No. 3,118,917                                January 21, 1964

Alberto Ercoli et al.

It is hereby certified that error appears in the above numbered patent requiring correction and that the said Letters Patent should read as corrected below.

Column 8, lines 53 to 63, the formula should appear as shown below instead of as in the patent:

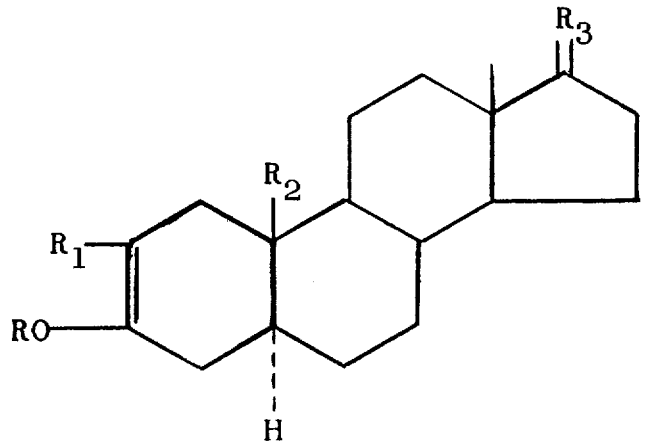

Signed and sealed this 14th day of July 1964.

(SEAL)
Attest:

ESTON G. JOHNSON                                EDWARD J. BRENNER
Attesting Officer                                 Commissioner of Patents